INVENTOR.
Philip C. Anderson,
BY Richards and Cifelli,
Attorneys

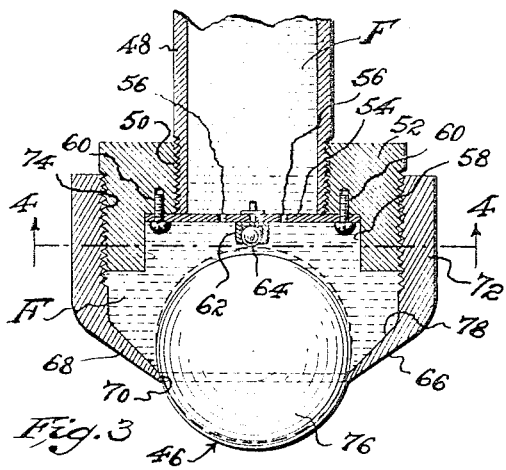
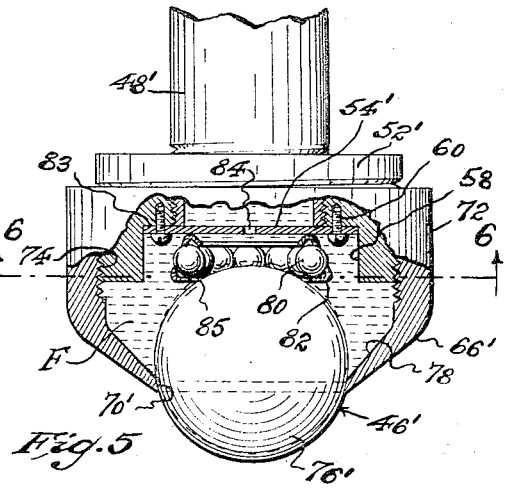
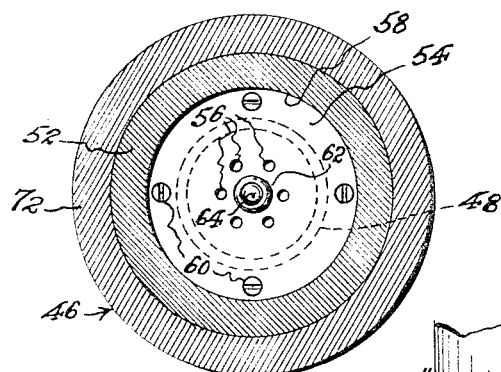
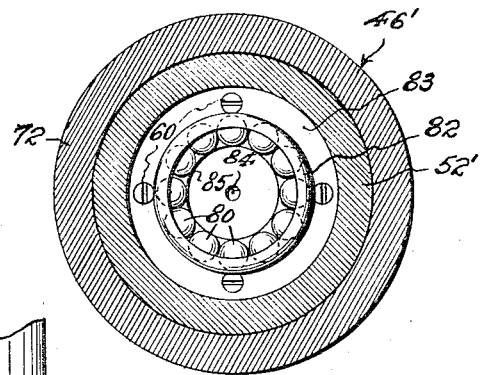
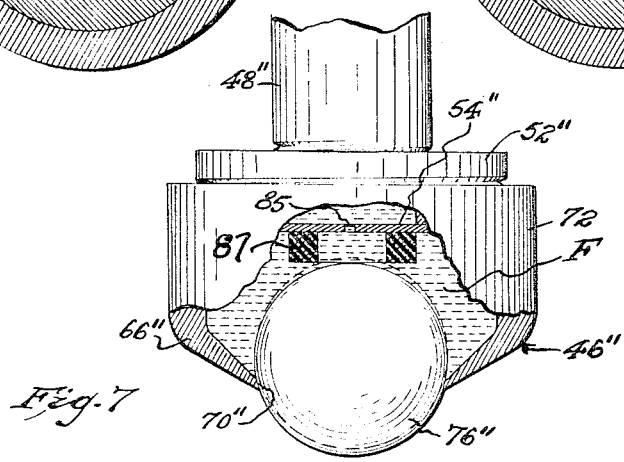

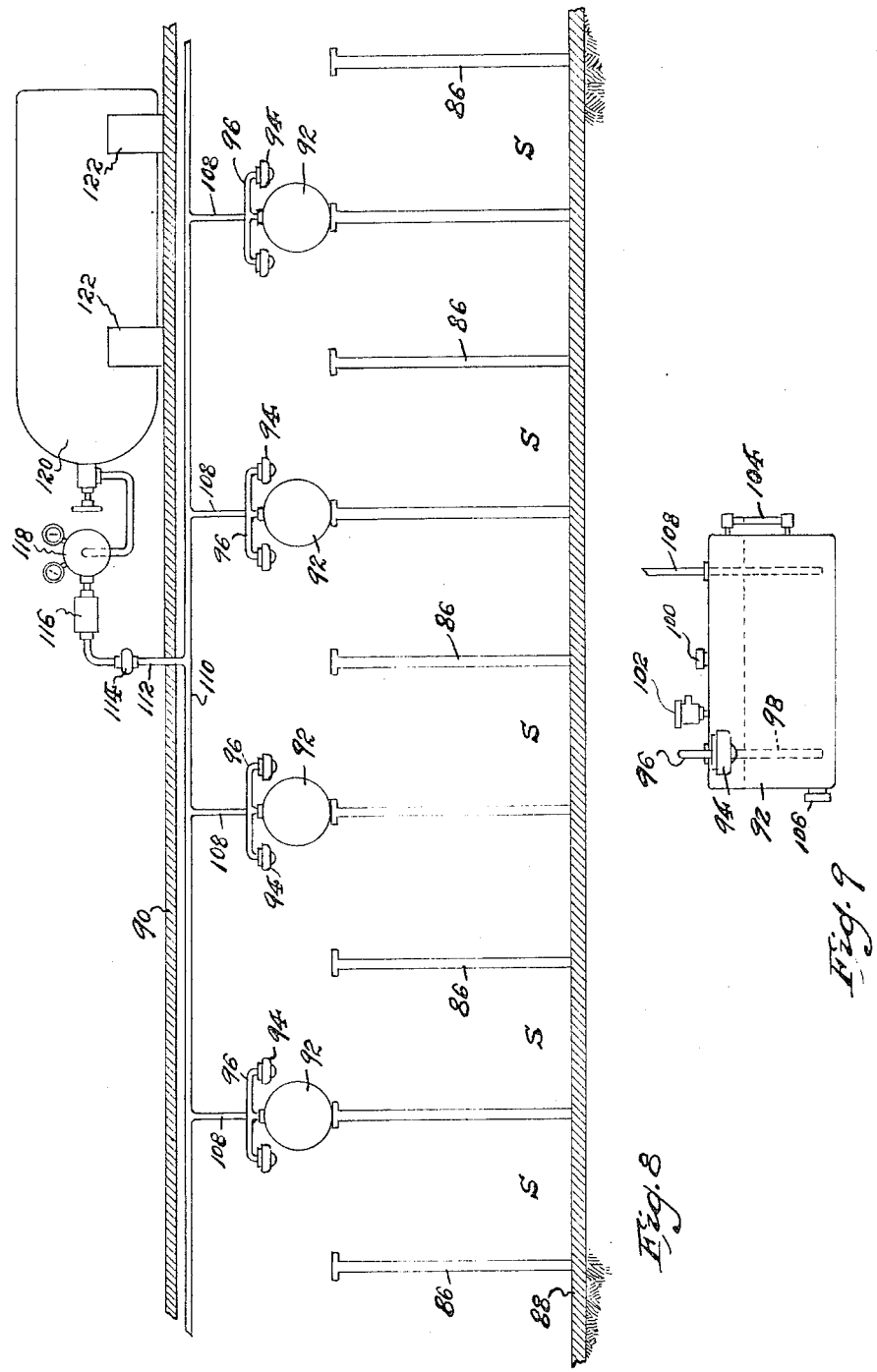

United States Patent Office 3,303,824
Patented Feb. 14, 1967

3,303,824
PRESSURIZED LIVESTOCK LIQUID FEED
DISPENSER
Philip C. Anderson, Crete, Nebr., assignor to Feed Service Corporation, Crete, Nebr., a corporation of Nebraska
Filed Apr. 13, 1965, Ser. No. 447,620
20 Claims. (Cl. 119—72.5)

This invention relates to liquid dispensers; more particularly to controlled pressurized liquid dispensers, and still more particularly to an improved pressurized livestock liquid feed dispenser.

The art of mass free choice feeding of livestock has been relatively neglected, and such feeding equipment as is available leaves much to be desired. The most effective livestock liquid feeding equipment available requires the utilization of a container equipped with either a feed wheel or ball that is accessible through the top of the container for licking by the animals. Since most modern liquid feeds contain volatile substances, such as ethyl alcohol, and oxidizable substances, such as vitamins A and E, it is desirable to store and dispense such liquid feeds in such feeding equipment with a minimum of evaporation and/or oxidation of the liquid feed constituents.

Furthermore, it is desirable that such feeding equipment be constructed to prevent the liquid feed from becoming contaminated with rain, water, dust, insects, birds or other undesirable environmental factors which render the liquid feed unpalatable to the animals, dilutes it, or permits premature fermentation to take place. The most effective and sophisticated prior art livestock liquid feed equipment available include upwardly facing feed wheel or ball surfaces which are subject to the deficiency that their feeding surfaces are exposed to various undesirable environmental elements.

Another serious deficiency of known prior art livestock liquid feed equipment is that it is incapable of dispensing liquid feed in a predetermined controlled manner. The livestock have access to the prior art feeding balls or wheels and as these devices operate on the principle of responding to licking by the animal and revolving the feed ball or wheel so as to be dipped into the body of liquid feed within the container, have some feed adhere to the surface of the ball or wheel and raise it to the exterior of the container, where it is accessible for licking, there is no control whatsoever over the rate of feeding or quantity of liquid feed dispensed. Therefore, the animals are free to consume the liquid feed at a rate and in quantities which they alone determine.

It is an object of this invention to provide an improved livestock liquid feed dispenser which possesses the following attributes:

(1) Permits free choice demand feeding by the livestock in a desirable controlled manner.

(2) Prevents contamination or dilution of the liquid feed by water, rain, dust, insects, birds and other undesirable environmental elements.

(3) Will dispense liquid feeds within a wide range of varying consistencies.

(4) Is constructed simply with a minimum of moving parts, and is reliable, safe and trouble free in operation.

It is another object of the invention to provide an improved livestock liquid feed dispenser of the foregoing type having an improved animal lick actuated dispensing valve means.

It is still another object of the invention to provide an improved livestock liquid feed dispenser of the foregoing type which lends itself to flexible practical application, in that it may be set up so as to feed individual animals or a herd of animals, for example in a barn, and when set up for the latter operation may be set up in varying ways.

The principal object of this invention is achieved in one form by the provision in a livestock liquid feed dispenser of: container means for housing a supply of animal liquid feed; means for subjecting the liquid feed stored in the container means to controlled gas pressure; conduit means extending from the interior to the exterior of the container means arranged to permit the flow of liquid feed therethrough under predetermined conditions; and animal actuated dispensing valve means normally closing the conduit means and disposed on the exterior of the container means in position to have portions contacted by the tongue of an animal and constructed to respond to licking to open the dispensing valve means to permit dispensing of some of the liquid feed to the animal under controlled pressure.

Other objects and further details of that which I believe to be novel and my invention will be clear from the following description and claims taken with the accompanying drawings wherein:

FIG. 3 is a central sectional view taken through the preferred form of valve dispensing means employed in the apparatus;

FIG. 4 is a sectional view taken substantially on line 4—4 of FIG. 3;

FIG. 5 is a central sectional view of a modified valve dispensing means;

FIG. 6 is a sectional view taken substantially on line 6—6 of FIG. 5;

FIG. 7 is a central sectional view of another modified form of a valve dispensing means;

FIG. 8 is a schematic view of the invention applied to a livestock stall feeding system, and FIG. 9 is a side elevational view of one of the liquid feed tanks employed in the FIG. 8 system.

Figure 1:
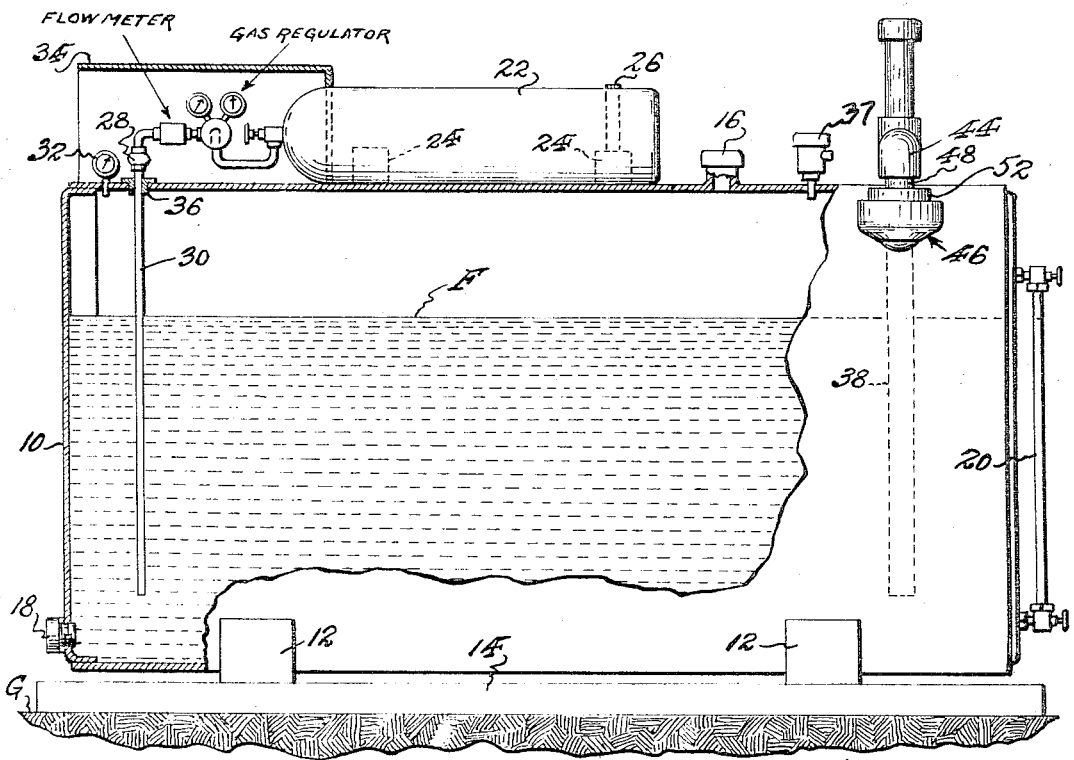
FIG. 1 is a side elevational view, with portions broken away as shown in section for clarity, of my improved livestock liquid feed dispensing apparatus.
Figure 2:
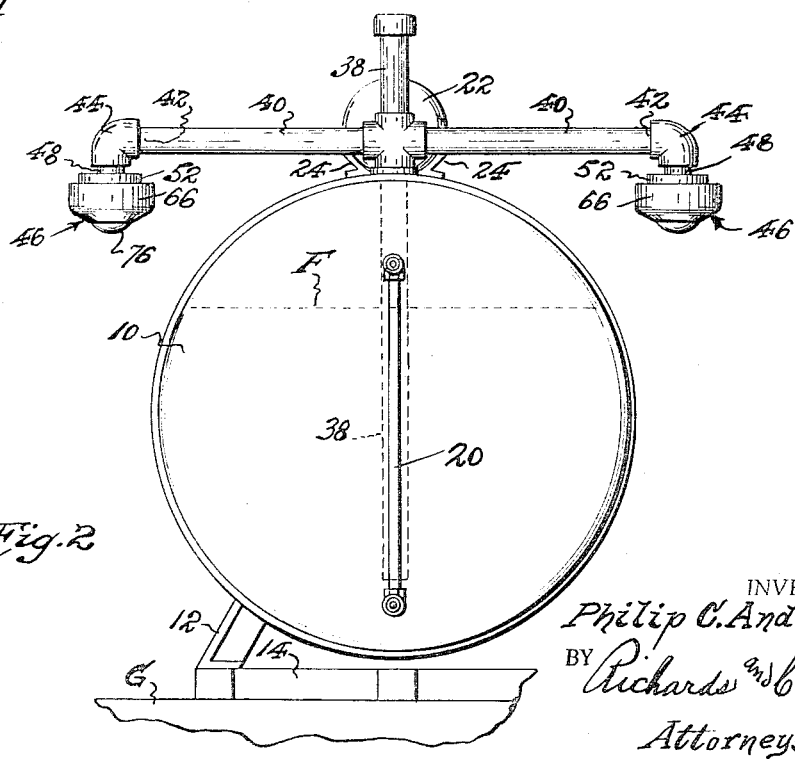
FIG. 2 is an end elevational view thereof looking from the right in FIG. 1.

With particular reference to FIGS. 1 and 2, the general construction, organization and operation of my improved livestock liquid feed dispensing apparatus will be understood. The apparatus comprises container means for storing a quantity of liquid feed, illustrated in the form of a cylindrical tank 10, having its major axis horizontally disposed relative to the ground G. The tank 10 may be of any desired capacity and made of any suitable material, such as wood, metal, plastic or the like and, if desired, may be or have portions thereof that are transparent or translucent. Preferably, tank 10 is made of a plastic, such as epoxy, lined sheet steel. The tank 10 may be mounted so as to be permanently stationary, as by being partially embedded in the ground. However, to render it portable, if desired, it may include a skin, such as one formed by metallic angle brackets 12 that are secured to the tank and to a wooden frame work 14, which may be conveniently made of 4" x 4" beams. Equipped with the illustrated skid formation, the tank 10 may be physically hauled about to change its location as desired. If desired, a conventional caster or wheel formation may be employed instead of a skid to permit rolling the tank about.

In use, the tank 10 houses animal liquid feed and dispenses it in a controlled manner under positive pressure. Therefore, a filler opening is provided at the top of the tank 10 which is closable by a filler plug cap 16. The cap 16 may be threaded and screw threaded into a threaded opening formed in the top of the tank, where it may be readily removed to permit the insertion of a hose or nozzle to permit filling of the tank with liquid feed. In order to permit complete evacuation for cleaning the interior of the tank 10, a removable threaded cleanout plug 18 is provided in a threaded opening formed at the bottom of one end wall of the tank. The interior of the tank may be cleaned in any known desirable manner. Removal of the cleanout plug 18 will permit draining of the liquid in the interior of the tank 10. Tilting of the tank 10 will facilitate complete removal of all such liquid.

In order to permit quick visual ascertainment of the level of the liquid in the tank 10, a liquid level sight indicator 20 is mounted on an end wall of the tank. It is a transparent tube which may be made of glass or plastic that extends vertically generally parallel to the end wall, includes lower and upper manually operated valves of known type which may be selectively closed to bypass the indicator or opened to permit some of the liquid to enter the sight tube to indicate the liquid level.

In use, the liquid feed stored in the tank 10 is subjected to pressure in a predetermined controlled manner. For this purpose, means is provided to subject the liquid feed in the tank to pressure and, as illustrated, this means comprises a gas cylinder 22 of high pressure compressed or liquified gas, preferably an inert gas such as nitrogen, and associated gas control mechanism. The gas cylinder 22 may be mounted at either end of the tank 10; however, it is preferably mounted at the top, as by a plurality of angle brackets 24 fixed to the top of the tank and one or more strap holders 26 that are arranged to encircle the cylinder and be secured to a pair of brackets. The gas cylinder 22 may be of standard construction and its usual outlet is connected to a gas pressure control regulator schematically designated as such, in FIG. 1. The gas regulator 22 is a component commercially available (e.g., Pinox R–1934 and R–1935 Regulators, made by Union Carbide Corporation, New York, New York), and preferably operates within a range of 0 to 30 pounds per square inch on its discharge side. A rate of gas flow meter, schematically indicated as such in FIG. 1 and calibrated or corrected for the gas being employed is connected to the discharge side of the gas regulator. The flow meter, which is also a commercially available standard component (e.g., Model 10A 4135 and Model 10A 4139 Minirators, made by Fischer & Porter Company, Warminster, Pennsylvania) preferably operates in a range of 0 to .14 cubic foot per hour. As is understood in the art, if a gas other than that for which the flow meter is calibrated is used, a correction factor, determinable in known manner, is applied. The outlet side of the flow meter is connected to a one-way in-line check valve 28 which permits flow of fluids only downwardly with reference to FIG. 1 from the flow meter to the interior of the tank 10 through a gas delivery line, which may be in the form of a metallic or flexible plastic tube 30. The lower end of the tube 30 is disposed a predetermined distance above the bottom of the tank 10. In order to provide a reading of the pressure within the tank 10 at all times, a standard pressure gauge 32 is mounted at the top of tank 10. To protect the various components that are co-located at the top of the tank 10, a plastic or metallic shield 34 is provided so as to be removably mounted in any convenient manner to cover them. At the area where the gas delivery tube 30 extends through the top wall of the tank 10, an appropriate sealing bushing 36 is provided to render the connection fluid tight.

In use, the apparatus operates under pressure and temperature conditions which may give rise to increase in pressure within the tank 10 that exceeds desirable or safe levels. Therefore, a pressure relief valve 37, of standard commercially available construction, is mounted at the top of the tank. Pressure relieve valve 37 may conveniently take the form of the weighted ball-orifice type in which the parts are designed so that the ball rises to open the orifice and permit the escape of gas to reduce pressure within the tank whenever its designed rating is exceeded. Although the pressure relief valve 37 is illustrated as being mounted directly in the top wall of the tank in FIG. 1, if desired, it may be incorporated into the filler plug cap 16 so as to be a composite filler plug cap-pressure relief valve sub-assembly.

To supply liquid feed to convenient dispensing locations, the FIGS. 1 and 2 modification of the invention employs a feed supply line that extends from within the tank 10 to the exterior thereof, in the form of a riser tube of a diameter substantially in excess of that of the gas delivery tube 30. The tube 38 may be any suitable material such as metallic or plastic, and its lower end is spaced a distance above the bottom of the tank 10 which is the same as that of the lower end of the gas delivery tube 30. The tube 38 extends through the top wall of the tank 10, where it is appropriately sealed, and extends above the top of the tank. On the upper outer side of the tank, the tube 38 is centrally connected by an appropriate fitting to a horizontally extending tube 40. The opposite ends 42 of the tube 40 are connected, as by the elbows 44 and vertical tube sections 48, to lick feed dispensing units, which are generally designated by reference numeral 46. The detailed construction and operation of the units 46 will be hereinafter set forth; however, for purposes of a general understanding of the operation of the invention, it should be presently understood that these units are designed so as to normally be positively pressure closed in a fluid-tight manner, but to be operated at the will of the animals by their licking dispensing portions of the units to open them and permit the outflow of some liquid feed, which in accordance with the general construction and operation of the overall apparatus, is under some positive pressure.

The general operation of the apparatus described thus far involves the introduction of gas under pressure through the gas delivery tube 30 to the interior of the tank 10 under conditions wherein the tank, which has been filled with a quantity of liquid feed through the filler plug cap opening with the cleanout plug opening closed, is sealed from the atmosphere. The buildup of pressure within the tank in a controlled manner, determined by the air pressure regulator and flow meter settings, causes the outflow of some of the liquid feed designated generally by reference character F in the drawings up through the feed delivery tube 38, through the horizontal tube 40, to the units 46, where it is present under predetermined positive pressure available for dispensing in response to the demand licking of the animals. The described positioning of the lower ends of tubes 30 and 38 produces uniform pressure at said lower ends regardless of the level of the liquid feed. Gas under controlled pressure is supplied by the gas cylinder 22, the gas regulator, the flow meter and into and through the gas delivery tube 30. Undesired reverse flow of fluids up through the gas delivery tube 30 is prevented by the one-way inline check valve 28. Any excess of pressure within the tank 10 is automatically dissipated through the pressure relief valve 37. The construction of the apparatus thus far described provides for the general operation of an improved pressurized liquid feed apparatus where liquid feed is automatically maintained under positive pressure at the dispensing units.

In the FIGS. 1 and 2 modification, there are two feed ball valve dispensing units provided. Any desired number within reason may be employed. However, it is desirable that the units be disposed at a level which is generally horizontally co-planar with the top of the tank to preclude any possibility of an undesirable siphoning action.

The particular detailed construction of the ball valve dispensing units 46 will be understood from an examination of FIGS. 3 and 4 which illustrates the preferable form thereof. One unit 46 will herein be described; however, this description applies to all of the units employed.

Unit 46 is connected to the downwardly facing arm of elbow 44 by a vertical tube section 48, the lower end of which is threaded at 50 and connected in a threaded opening in the bushing 52, preferably of plastic. The lower end of the tube section 48 is opened and exposed by an apertured disc 54, preferably of a suitable plastic material, which includes a plurality of spaced through openings 56. The disc 54 is secured within an enlarged counterbored recess 58 in the bushing 52 by a plurality of screws 60. Depending centrally of the disc 54 is a ball bearing carrier 62 which rotatably carries a single ball bearing 64. A cup-like cap 66, preferably of plastic, having a tapered wall portion 68 culminating in a circular opening 70 and cylindrical mounting portion 72, is threadedly secured at 74 to the threaded outer end of the bushng 52.

A round feed ball 76, preferably made of a plastic material but which may comprise a plastic coated metallic ball, is disposed within the cavity 78 formed by the connected cap 66 and bushing 52. The feed ball 76 has a diameter which is slightly larger than that of the opening 70 in the cap 66. The parts of the feed ball valve dispensing unit are of such a dimension and disposition as to permit the feed ball 76 to assume two general limit positions in operation. With reference to FIG. 3, the solid line position is its lowermost position and the dotted line position is the uppermost position. In the lowermost position, the unit is closed by virtue of the engagement of surface portions of feed ball 76 with the rim portions of the cap 66 which define the opening 70. The feed ball 76 is normally retained in its lowermost position to close the opening 70 by the combined effect of its own weight and the positive pressure exerted on it by the liquid feed F. Therefore, the dispensing units 46 are normally closed in a fluid tight manner.

When an animal desires to partake of some of the liquid feed, he licks the feed ball 76, which is thereby caused to be moved upwardly against the downward forces acting on it to the limit of the contact of the ball bearing 64 (its dotted line position). This results in a spurt of some liquid feed out the clearance between the feed ball and its opening, and a film of liquid feed being formed on the outer surface of the feed ball 76 which may be rotated relative to the cap 66 and be moved to the exterior thereof where it is accessible for consumption by the animal. Termination of licking results in prompt positive pressure return of the feed ball to its lowest position to close opening 70. As the exposed portions of the feed ball 76 that project to the exterior of the feed ball valve units face downwardly, the feed balls are self cleaning and not disposed for normal contact by rain, or other diluting or contaminating environmental elements. The overall construction of the ball valve dispensing units, including the ball bearing 64, is such as to render rotation of the feed ball an easy manipulation by the animal, and the operation is smooth. As there is always some pressure acting on the feed ball to move it to its downward closed position, except when the cavity 78 is only partly full, feed losses due to leakage are minimized.

Even when the cavity 78 is only partly full, losses are avoided if the specific gravity of the ball is sufficiently high to effect a seal. When the animal dislodges the ball by licking it, there is an initial surge of liquid feed, which is consistent with the animal's normal desires and mode of feeding. After the initial spurt of liquid feed in the cavity 78 is dispensed, the pressure acting on the feed ball 76 is reduced slightly; however, the supply of liquid feed to the cavity 78 is always maintained through the tube section 48 and through openings 56 in the disc 54 under some pressure.

FIGS. 5 and 6 show a modification of the ball valve dispensing units which are designated generally 46'; and wherein the principal components of which that are similar to those of the FIGS. 3 and 4 modification are indicated by the same reference numeral with a prime (') added. The major differences between the FIGS. 5 and 6 modification relative to the FIGS. 3 and 4 modification are that: (1) the single ball bearing 64 and its carrier of the latter modification is replaced by a plurality of ball bearings 80 that are retained in a ball bearing cage 82 and (2) a single opening 84 is formed in the disc 83 in the FIGS. 5 and 6 modification in lieu of the plurality of openings 56 formed in the disc 54 of the FIGS. 3 and 4 modification. The feed ball 76' functions in the feed opening 70' in substantially the same manner as the feed ball 76 relative to feed opening 70 in the FIGS. 3 and 4 modification. The parts of the unit 76' are dimensioned and disposed so as to permit substantially the same amount of relative vertical movement of the feed ball 76' relative to the cap 66' as is permitted feed ball 76 in the FIGS. 3 and 4 modification. During operation of the FIGS. 5 and 6 modification, the feed ball 76' has bearing contact with the ball bearings 80.

FIG. 7 illustrates another modification of the ball valve feed units which is designated generally 46" and wherein corresponding elements to those in the FIGS. 3 and 4 modification are designated by the same reference number with a double prime ("). The FIG. 7 modification is substantially the same as the FIGS. 5 and 6 modification, and in this regard it will be observed that the disc 54" has a single opening 85 as the disc 83 of the former modification. The major difference is that the cage 82 and plurality of ball bearings 80 of the FIGS. 5 and 6 modification have been replaced by a resilient cushion, which is illustrated in FIG. 7 in the form of a ring 87. The general operation of the FIG. 7 modification is similar to that of the first two modifications described.

The foregoing constitutes a full disclosure of a single tank pressurized livestock liquid feed apparatus and three alternative feed ball valve dispensing unit constructions. In practice, the following example of a successfully operative embodiment of the invention has been ascertained. The liquid feed tank had a capacity of 445 gallons. The filler plug cap was removed and the tank was filled with a liquid feed having a specific gravity of 1.3 (e.g., liquid feed sold by Feed Service Corporation, Crete, Nebraska, as Morea® Liquifeed) to a full mark which indicates the presence of 400 gallons of the liquid feed within the tank, thereby leaving an air space of 45 gallons above the liquid feed within the tank. The liquid feed used in this example was that sold under the name Morea® by the Feed Service Corporation, Crete, Nebraska. A gas cylinder of compressed nitrogen was employed as the pressure producing medium and its outlet valve was cracked slightly for a few moments to eject any foreign particles, closed, and then connected to the gas regulator and flow meter. The gas cylinder valve was then completely opened and pressure was indicated on the gas regulator inlet gauge. The regulator discharge was set for 5 pounds per square inch pressure and the valves of the flow meter were completely opened. The introduction of nitrogen with the filler plug cap removed permitted purging of the oxygen out of the tank in a few minutes and then the filler plug cap was replaced. The needle valve adjustment of the flow meter was set, which may be calibrated empirically to directly designate various rates of dispensing of the liquid feed, corresponding to rates of flow of the gas that is desired, for example, related to a 24 hour feeding period. The apparatus was then operational.

When operational, assuming the animal's demand for the liquid feed equals or exceeds the capacity of the apparatus, the amount of liquid feed dispensed in a designated period may be controlled by setting the flow meter. The construction of the apparatus is such that there is a valve closing positive pressure on the feed balls of the ball valve dispensing units at all times, and the maximum pressure is constant regardless of the level of the liquid feed within the tank, because of the disposition of the lower ends of the gas delivery tube and the feed supply tube, as mentioned above. It was ascertained that in the actual example discussed, the minimum dispensing pressure required was 2.25 pounds per square inch. If a different type of liquid feed having a different specific gravity is employed, the minimum dispensing pressure must be ascertained. This may be calculated by known laws of physics or it may be ascertained practically by removing the feeding ball valve units 46 from tube sections 48 and slowly opening the gas pressure control valve of the gas regulator in small increments, e.g., ¼ p.s.i., while the flow meter needle valve is fully opened, and observing when the liquid feed first begins to flow out of the tube sections. If the apparatus were set to operate at a minimum dispensing pressure, it will be necessary for the animals to feed continuously in order to consume the full quota permitted for the time period involved. To permit full usage of the animal's quota in a noncontinous manner, for example, in two daily feedings, additional gas pressure must be applied to the liquid feed, of approximately 2¾ pounds per square inch. Hence, a basic five pounds per square inch operating pressure reading on the regulator is employed.

It has been found that the feeder of this example will dispense from about 20 to about 290 pounds of Morea® Liquifeed per day.

With the foregoing size tank and operating conditions, a 5 pounds per square inch pressure relief valve 37 was selected, and therefore, it is designed to maintain the operating pressure at that level. The check valve 28 is selected to open at ⅓ pound per square inch pressure and, therefore, some pressure is dissipated in maintaining it open. The operating pressure is approximately 4⅔ pounds per square inch, though the air regulator discharge gauge is set for 5 pounds per square inch. For liquid feeds of different consistencies and weights, various adjustments in the apparatus may be effected, and be determined either empirically or in accordance with known physical principles.

If desired, my improved liquid feed dispensing apparatus may be arranged to feed a herd of livestock. FIG. 8 illustrates one schematic arrangement for doing so; however, there are other arrangements which may be employed which will be subsequently described. In FIG. 8 there are illustrated a plurality of stalls S which may be conveniently formed by plurality of stanchions 86 in a barn having a floor 88 and an overhead 90. Alternate stanchions 86 support a liquid feed tank 92 equipped with a feed supply system including a pair of feed ball valve dispensing units 94 supported by a horizontal tube 96 that communicates with a feed supply tube 98 that extends into the tank 92. The tank 92 and associated elements described thus far are similar to their counterparts in the FIGS. 1 and 2 modification, and may further include a filler plug cap 100, a pressure relief valve 102, a liquid level sight indicator 104 and a cleanout plug 106. Each tank 92 in the FIG. 8 arrangement includes a separate gas delivery tube 108 that extends into the interior of the tank. The gas delivery tubes 108 each communicate with a gas delivery manifold tube 110 which, in turn, communicates with main gas supply tube 112 having a one way inline check valve 114 therein, a rate of flow meter 116, a gas pressure regulator 118, and ultimately connected to the outlet valve of gas cylinder 120.

The structural arrangement of FIG. 8 described thus far functions to dispense in a controlled manner an overall volume of liquid feed in a prescribed period of time, individually at the tanks 92 in accordance with the demand of the individual animals in the stalls as evidenced by licking the feed ball portions of the feed ball valve dispensing units 94. The gas delivery manifold tube 110 supplies gas to the individual gas delivery tubes 108 for the individual tanks. The gas cylinder 120 is nested in the mounting brackets 122 secured on the upper side of overhead 90.

This system is essentially a herd system of feeding, in that feeding at the individual stalls is not regulated, but rather the feeding rate for the overall system is regulated. It may be modified and preserve its herd feeding character by substituting a single conventional large liquid feed tank, which can be conveniently mounted on the upper side of the overhead 90, to replace the individual tanks 92 at the stalls, and have a plurality of feed supply tubes extend to the individual stalls where the ball valve dispensing units may be disposed. This system functions substantially the same as the FIG. 8 system, but simply replaces the individual tanks 92 by an enlarged tank.

If desired, the FIG. 8 system may be modified to provide individual control at the individual stalls. This may be effected by providing a flow meter in the gas supply line 108 of each individual tank and setting it to feed the the desired amount of liquid feed at a desired rate over the prescribed period of time.

As will be evident from the foregoing description, certain aspects of my invention are not limited to the particular details of construction of the examples illustrated, and I contemplate that various other modifications and applications will occur to those skilled in the art. It will also be evident that I have provided improved animal liquid feed dispensing apparatus which achieves each and every object of this invention. It is, therefore, my intention that the appended claims shall cover all modifications and applications of the invention as do not depart from the true spirit and scope of the invention.

What I claim as new and desire to secure by Letters Patent of the United States is:

1. An animal liquid feed apparatus comprising: container means for housing a supply of animal liquid feed; means for supplying a suitable gas under selectively controlled pressure and rate of flow to the interior of said container means, whereby the liquid feed therein is maintained under pressure; conduit means extending from the interior to the exterior of said container means and arranged to permit the flow of liquid feed therethrough under predetermined conditions; and dispensing valve means in communication with and normally closing said conduit means, disposed on the exterior of said container means and having portions in position to be licked by the tongue of an animal and constructed to respond to such licking to open said dispensing valve means to permit dispensing of some of said liquid feed to the animal under controlled pressure, said dispensing valve means comprising a cavitied body having a lower wall with a circular dispensing opening therein; a round feed ball of a diameter slightly larger than that of said opening rotatably disposed within the cavity in said body, resting on said lower wall and having a spherical portion projecting downwardly through said opening; and limiting means for maintaining said ball in close liquid-dispensing contact and in rotatable operational relationship with said opening whereby the liquid forms a coating on said spherical portion of said ball on rotation of the latter.

2. The apparatus of claim 1 wherein said gas supplying means includes a gas supply tube that extends through said container means and has an open gas outlet end disposed adjacent to the bottom thereof normally below the level of the liquid feed therein.

3. The apparatus of claim 2 wherein said conduit means includes a feed supply tube that extends through said container means and has an open feed inlet end disposed adjacent the bottom thereof at substantially the same level as the level of said gas outlet end.

4. The apparatus of claim 1 which further includes means for maintaining the pressure within said container means at a pre-selected level.

5. The apparatus of claim 1 which further includes means for visually indicating the level of the liquid feed within said container means.

6. The apparatus of claim 1 wherein said conduit means includes a feed supply tube that extends through said container means and has an open feed inlet end adjacent the bottom thereof normally below the level of the liquid feed therein.

7. The apparatus of claim 1 which further includes normally closed liquid feed filling openings means for said container means at the top thereof.

8. The apparatus of claim 1 which further includes normally closed cleanout opening means near the bottom thereof.

9. The apparatus of claim 1 wherein said container means includes means for facilitating movement over the ground to render the apparatus portable.

10. The apparatus of claim 1 wherein said gas supplying means includes a check valve for preventing reverse flow of gas from said container means through said gas supplying means.

11. The apparatus of claim 1 wherein said dispensing valve means is disposed at the approximate level of the top of said container means and its lickable portions project downwardly.

12. The apparatus of claim 1 wherein said limiting means comprises a rotatably mounted ball bearing disposed within the cavity in said body slightly above said feed ball.

13. The apparatus of claim 1 wherein said limiting means comprises a plurality of ball bearings supported in an annular retainer cage disposed within the cavity in said body above said feed ball.

14. The apparatus of claim 1 wherein said limiting means comprises a ring of resilient material disposed within the cavity in said body spaced slightly above said feed ball, for direct contact with the surface of the ball.

15. The apparatus of claim 1 wherein said conduit means includes a plurality of tubes extending to and terminating at a plurality of remote locations; and said dispensing valve means comprises a plurality of dispensing valve assemblies, one disposed at the termination of each tube.

16. An animal liquid feed apparatus comprising: a liquid feed tank; a removable filler plug cap removably mounted in said tank to permit introduction of liquid feed into said tank; unidirectional gas delivery means including a source of gas under pressure and gas pressure regulating and flow control means communicating with the interior of said tank through a tube that is open at a point near the bottom of the tank to place the liquid feed therein under controlled pressure; liquid feed supply means including a tube extending from a point near the bottom of the tank level with that of the open part of the gas delivery tube to the exterior of said tank and terminating in a pair of spaced feed ball valve dispensing units, each at the level of the top of said tank; each of said units comprising a cavity having a lower wall with a circular dispensing opening therein; a round feed ball of a diameter slightly larger than that of said opening rotatably disposed within the cavity in said body, resting on said lower wall and having a spherical portion projecting downwardly through said opening; and limiting means for maintaining said ball in close liquid-dispensing contact and in rotatable operational relationship with said opening whereby the liquid forms a coating on said spherical portion of said ball on rotation of the latter.

17. Dispensing valve means, which comprises a cavitied body containing liquid and having a lower wall with a circular dispensing opening therein; a round feed ball of a diameter slightly larger than that of said opening rotatably disposed within the cavity in said body, resting on said lower wall and having a spherical portion projecting downwardly through said opening; and means for limiting the amount of upward movement of said ball a distance corresponding to the thickness of the coating of liquid dispensed and carried by said ball.

18. The dispensing valve means of claim 17, wherein said limiting means comprises a rotatably mounted ball bearing disposed within the cavity in said body slightly above said feed ball.

19. The dispensing valve means of claim 17, wherein said limiting means comprises a plurality of ball bearings supported in an annular retainer cage disposed within the cavity in said body above said feed ball.

20. The dispensing valve means of claim 17, wherein said limiting means comprises a ring of resilient material disposed within the cavity in said body spaced slightly above said feed ball.

References Cited by the Examiner

UNITED STATES PATENTS

| | | | |
|---|---|---|---|
| 2,307,220 | 1/1943 | Hewitt | 119—72.5 |
| 2,319,928 | 5/1943 | Hart | 119—75 |
| 2,571,536 | 10/1951 | Bush | 119—159 |
| 2,726,636 | 12/1955 | Frederiksen | 119—72.5 |
| 2,739,568 | 3/1956 | Duncan | 119—14.09 |
| 2,758,566 | 8/1956 | Talbott | 119—51 |
| 2,929,355 | 3/1960 | Paquette | 119—51 |
| 2,982,247 | 5/1961 | Varese et al. | 119—14.46 |
| 3,089,463 | 5/1963 | Grunzke | 119—71 |

FOREIGN PATENTS

| | | |
|---|---|---|
| 26,012 | 12/1930 | Australia. |
| 128,091 | 6/1948 | Australia. |

SAMUEL KOREN, *Primary Examiner.*

ALDRICH F. MEDBERY, *Examiner.*